(12) United States Patent
Bell et al.

(10) Patent No.: US 6,695,351 B2
(45) Date of Patent: Feb. 24, 2004

(54) INTERNAL BULKHEAD FOR SPRING SEAT REINFORCEMENT

(75) Inventors: Dale K. Bell, Ortonville, MI (US); David K. Platner, Shelby, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 299 days.

(21) Appl. No.: 09/847,251

(22) Filed: May 2, 2001

(65) Prior Publication Data

US 2002/0163174 A1 Nov. 7, 2002

(51) Int. Cl.[7] ............................................. B62D 21/00
(52) U.S. Cl. ...................... 280/797; 280/781; 280/796; 280/798
(58) Field of Search ............................... 280/781, 796, 280/797, 798, 124.128, 124.153; 296/205

(56) References Cited

U.S. PATENT DOCUMENTS

| | | | |
|---|---|---|---|
| 2,747,887 A | * | 5/1956 | Schilberg ..................... 280/794 |
| 2,939,719 A | * | 6/1960 | Parker ......................... 280/793 |
| 3,622,171 A | * | 11/1971 | Gottschalk |
| 4,181,323 A | | 1/1980 | Raidel |
| 4,310,171 A | | 1/1982 | Merkle |
| 4,655,467 A | | 4/1987 | Kitzmiller et al. |
| 4,723,790 A | | 2/1988 | Wharton |
| 4,900,057 A | | 2/1990 | Raidel |
| 5,163,701 A | | 11/1992 | Cromley, Jr. |
| 5,277,450 A | | 1/1994 | Henschen |
| 5,326,128 A | | 7/1994 | Cromley, Jr. |
| 5,409,254 A | | 4/1995 | Minor et al. |
| 5,411,286 A | | 5/1995 | Pittman |
| 5,785,345 A | * | 7/1998 | Barlas et al. .......... 280/124.116 |
| 6,007,078 A | * | 12/1999 | Gottschalk et al. ......... 280/81.6 |
| 6,032,967 A | | 3/2000 | Ogoniek |
| 6,257,606 B1 | * | 7/2001 | Hynes et al. .................. 267/40 |
| 6,328,377 B1 | * | 12/2001 | Makita et al. ............... 296/194 |

* cited by examiner

*Primary Examiner*—Paul N Dickson
*Assistant Examiner*—Joselynn Y. Sliteris
(74) *Attorney, Agent, or Firm*—Carlson, Gaskey & Olds

(57) ABSTRACT

A vehicle chassis having a hollow structural member is provided with an opening at an end. A cavity extends from the opening and is defined by interior walls. The hollow structural member may be an axle or a portion of a frame. A bulkhead is arranged in the cavity transverse to the interior walls and spaced from the opening. The bulkhead substantially extends between and connects the interior walls, preferably at a right angle. The chassis component, such as an air spring or a member clamped to the hollow structural member with a U-bolt, is supported exteriorly on the hollow structural member. The chassis component generates a force and the bulkhead provides a counterforce to maintain the structural integrity of the hollow structural member. In this manner, the hollow structural member is relatively thin to save weight and cost and is better able to withstand bending and torsional forces without the use of specialized brackets.

16 Claims, 1 Drawing Sheet

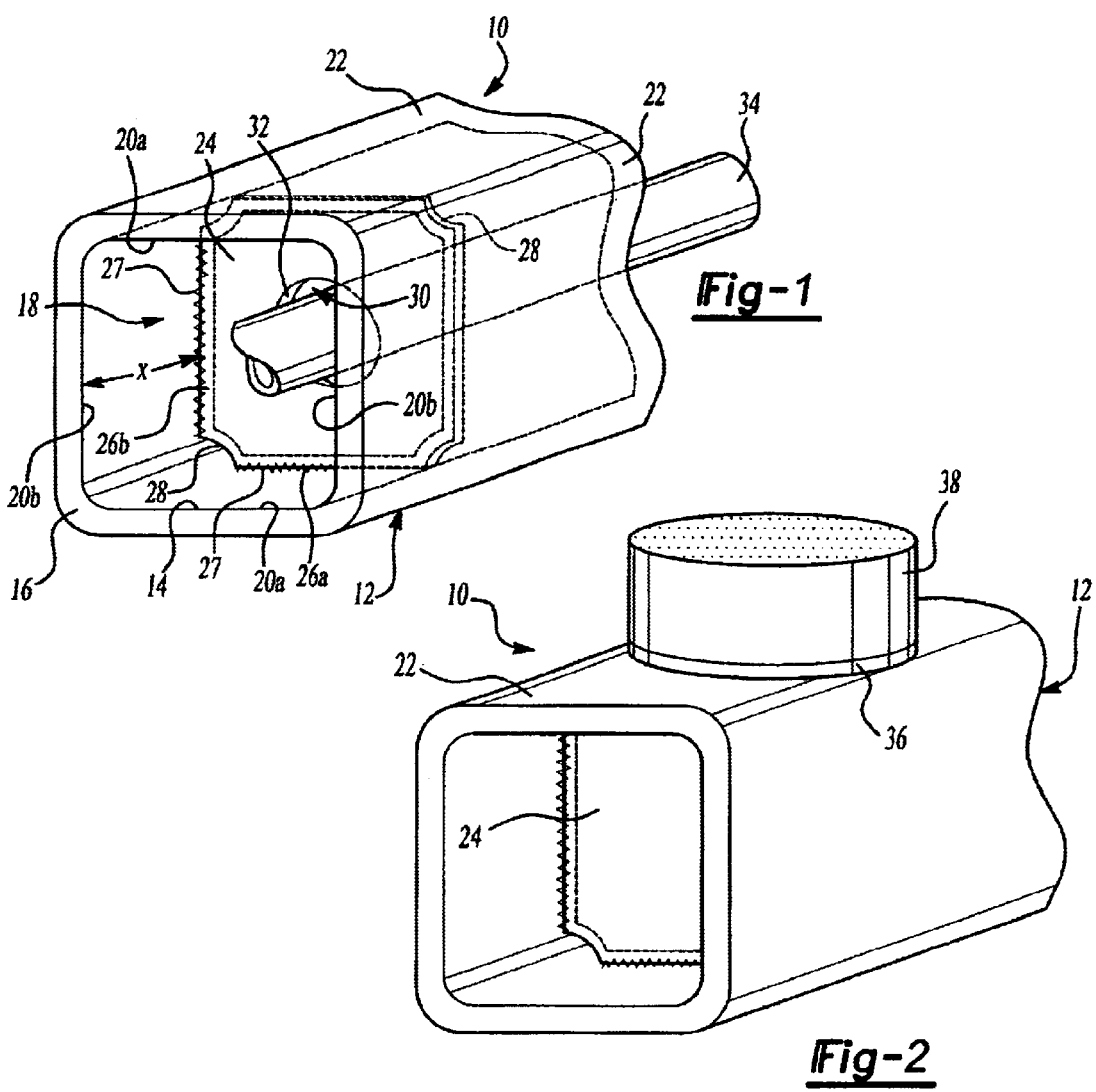
*Fig-1*
*Fig-2*
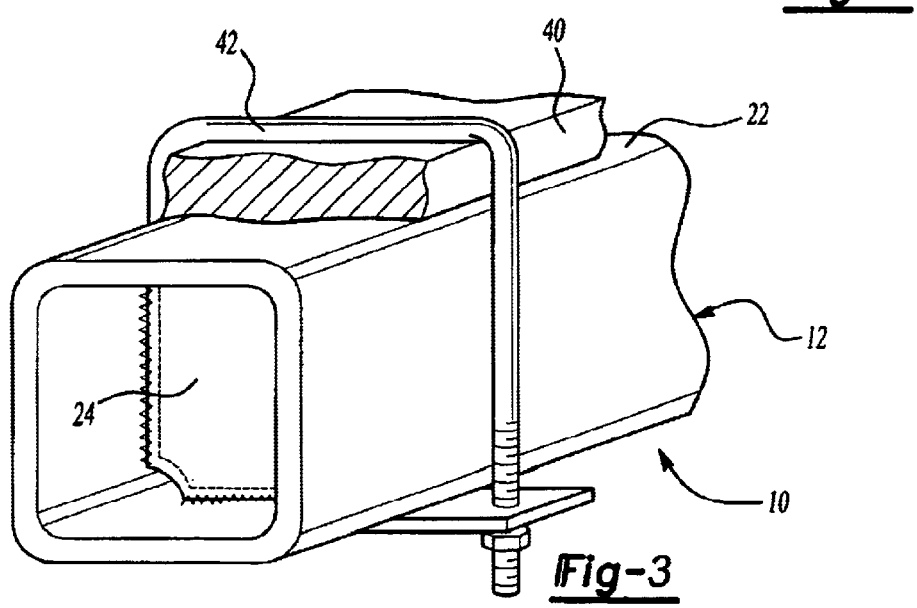
*Fig-3*

INTERNAL BULKHEAD FOR SPRING SEAT REINFORCEMENT

BACKGROUND OF THE INVENTION

This invention relates to a chassis for motor vehicles, and more particularly, the invention relates to structural members such as portions of the frame supporting a suspension assembly or a portion of a hollow axle beam.

Hollow members are frequently used in the construction of chassis components such as axles and portions of frames. The use of tubular members permits the weight of the chassis to be greatly reduced. The tubular members of the chassis undergo numerous bending and torsional forces which may compromise the structural integrity of the member. As a result, the tubular members are designed such that the wall thickness is sufficient to maintain the structural integrity of the member under these torsional and bending forces. However, increased wall thickness adds weight to the chassis.

To reduce the wall thickness of the tubular members and transmit the torsional and bending forces into the tubular member in a structurally desirable manner, brackets are frequently secured to the member. Brackets are used to transmit bending, torsional and shear forces such as those produced by a variety of suspension components attached to the tubular member. Use of brackets may be expensive in that they sometimes require complex welds to attach the brackets to the tubular member. It is desirable to provide a tubular member for use in a chassis with a relatively thin wall to save weight and cost without requiring specialized brackets to secure chassis components to the tubular member to successfully transmit suspension loads to that tubular member.

SUMMARY OF THE INVENTION AND ADVANTAGES

The present invention provides a vehicle chassis having a hollow structural member with an opening at an end. A cavity extends from the opening and is defined by interior walls. The hollow structural member may be an axle or a portion of a frame. A bulkhead is arranged in the cavity transverse to the interior walls and spaced from the opening. The bulkhead substantially extends between and connects the interior walls, preferably at a right angle. The chassis component, such as an air spring or a member clamped to the hollow structural member with a U-bolt or other means, is supported exteriorly on the hollow structural member. The chassis component generates a force and the bulkhead provides a counterforce to the force to maintain the structural integrity of the hollow structural member. In this manner, the hollow structural member is better able to withstand bending and torsional forces without the use of specialized brackets.

Accordingly, the above invention provides a tubular member for use in a chassis with a relatively thin wall that does not require specialized brackets to secure chassis components to the tubular member.

BRIEF DESCRIPTION OF THE DRAWINGS

Other advantages of the present invention can be understood by reference to the following detailed description when considered in connection with the accompanying drawings wherein:

FIG. 1 is a perspective view of the hollow structural member of the present invention;

FIG. 2 is a perspective view of the hollow structural member of the present invention supporting an air spring; and FIG. 3 is a perspective view of the hollow structural member of the present invention with a chassis member clamped thereto using a U-bolt assembly.

DETAILED DESCRIPTION OF THE PREFERRED EMBODIMENT

A portion of a vehicle suspension 10 is shown in FIG. 1. The vehicle chassis 10 includes a hollow structural member 12 or tubular member that has a length. The member 12 may be a portion of a frame, a non-drive axle, or a drive axle. The member 12 may have an end 16 defining an opening 14. A cavity 18 extends from the opening 14 and is defined by interior walls 20a and 20b. Preferably, the member 12 has a quadrilateral cross-section, and more preferably, the member 12 has a rectangular cross-section. However, it is to be understood that the member 12 may have any shaped cross-section. The member 12 includes exterior walls 22 to which chassis components may be supported and secured.

According to the present invention, the vehicle suspension 10 includes a bulkhead 24 arranged in the cavity 18 and secured to the interior walls 20a and 20b. The bulkhead 24 is spaced from the opening 14 a distance X toward the interior of the cavity 18. Preferably, the bulkhead 24 is arranged within the cavity 18 in a location that produces a desirable counterforce to the bending and torsional forces generated by the chassis components. By way of example, the bulkhead 24 may be spaced from the end 16 by a distance of approximately 3 inches.

Bulkhead 24 includes outer edges 26a and 26b that are secured to the interior walls 20a and 20b, preferably by weld beads 27. However, it is to be understood that the bulkhead 24 may be press fit into the cavity 18 such that it is securely retained within the member 12 and will not be dislodged when subjected to torsional and bending forces. The bulkhead 24 may also include notches 28 for accommodating interior rounded corners of the structural member 12.

The bulkhead 24 may be a solid piece or may include an aperture 30 for lightening the bulkhead 24 or for receiving components such as drive axle 34. The drive axle 34 is spaced from a perimeter 32 of the aperture 30 so that it may rotate therein without contacting the bulkhead 24.

The bulkhead 24 of the present invention significantly strengthens and increases the structural integrity of the member 12 such that an increase in the wall thickness of the member 12 or the use of specialized brackets for supporting chassis components is unnecessary. Referring to FIG. 2, a chassis component such as a spring seat 36 is supported on the exterior wall 22 of the member 12 in the area of the bulkhead 24. The spring seat 36 transmits axial loads from an air spring 38 to the member 12. The bulkhead 24 prevents the forces generated by the air spring from significantly bending the member 12 and compromising the structural integrity of the hollow structural member 12. Similarly, the member 12 is subjected to axial forces from chassis components such as the member 40 which is clamped to the member 12 by U-bolt assembly 42, as shown in FIG. 3. The member 40 and U-bolt assembly 42 are arranged in the area of the bulkhead 24 to prevent buckling of the member 12 under the forces generated by the member 40 and U-bolt assembly 42.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A vehicle suspension comprising;
   a hollow structural member having an opening at an end and a cavity extending from said opening defined by interior walls;
   a bulkhead arranged in said cavity transverse to said interior walls and spaced from said opening, said bulkhead substantially extending between and connecting said interior walls;
   a chassis component supported exteriorly on said hollow structural member and generating a force with said bulkhead providing a counterforce to said force to maintain structural integrity of said hollow structural member; and
   wherein said hollow structural member is a non-drive axle.

2. A vehicle suspension comprising:
   a hollow structural member having an opening at an end and a cavity extending from said opening defined by interior walls;
   a bulkhead arranged in said cavity transverse to said interior walls and spaced from said opening, said bulkhead substantially extending between and connecting said interior walls;
   a chassis component supported exteriorly on said hollow structural member and generating a force with said bulkhead providing a counterforce to said force to maintain structural integrity of said hollow structural member; and
   wherein said hollow structural member is a drive axle.

3. The vehicle suspension according to claim 2, wherein said bulkhead includes an aperture, and said drive axle includes a drive shaft disposed in said drive axle and extending through said aperture in spaced relation from a perimeter defining said aperture.

4. The vehicle chassis according to claim 1, wherein said hollow structural member has a quadrilateral cross-section.

5. The vehicle chassis according to claim 4, wherein said quadrilateral cross-section is rectangular.

6. The vehicle chassis according to claim 1, wherein said bulkhead is arranged generally perpendicular to said interior walls.

7. The vehicle chassis according to claim 1, wherein said chassis component is a spring seat.

8. The vehicle chassis according to claim 1, wherein said bulkhead includes outer edges substantially connected to said interior walls.

9. The vehicle chassis according to claim 8, wherein said outer edges are welded to said interior walls.

10. A vehicle suspension comprising:
    a hollow structural member having an opening at an end and a cavity extending from said opening defined by interior walls;
    a bulkhead arranged in said cavity generally perpendicular to and substantially extending between said interior walls and space from said opening, said bulkhead including outer edges substantially connecting said interior walls to maintain structural integrity of said hollow structural member;
    wherein said hollow structural member includes a cross-section through said interior walls proximate said bulkhead with said hollow structural member having a generally uniform wall thickness at said cross-section; and
    wherein said hollow structural member is a non-drive axle.

11. A vehicle suspension comprising:
    a hollow structural member having an opening at an end and a cavity extending from said opening defined by interior walls;
    a bulkhead arranged in said cavity generally perpendicular to and substantially extending between said interior walls and spaced from said opening, said bulkhead including outer edges substantially connecting said interior walls to maintain structural integrity of said hollow structural member;
    wherein said hollow structural member includes a cross-section through said interior walls proximate said bulkhead with said hollow structural member having a generally uniform wall thickness at said cross-section; and
    wherein said hollow structural member is a drive axle.

12. The vehicle suspension according to claim 11, wherein said bulkhead includes an aperture, and said drive axle includes a drive shaft disposed in said drive axle and extending through said aperture in spaced relation from a perimeter defining said aperture.

13. The vehicle suspension according to claim 11, wherein said hollow structural member has a quadrilateral cross-section.

14. The vehicle suspension according to claim 13, wherein said quadrilateral cross-section is rectangular.

15. The vehicle suspension according to claim 11, wherein said outer edges are welded to said interior walls.

16. The vehicle suspension according to claim 3, wherein said hollow structural member includes a cross-section through said interior walls proximate said bulkhead with said hollow structural member having a generally uniform wall thickness at said cross-section.

* * * * *

UNITED STATES PATENT AND TRADEMARK OFFICE
CERTIFICATE OF CORRECTION

PATENT NO.    : 6,695,351 B2
DATED         : February 24, 2004
INVENTOR(S)   : Bell et al.

It is certified that error appears in the above-identified patent and that said Letters Patent is hereby corrected as shown below:

<u>Column 4,</u>
Line 9, "space" should read as -- spaced --.

Signed and Sealed this

Twenty-seventh Day of April, 2004

JON W. DUDAS
*Acting Director of the United States Patent and Trademark Office*